US005248542A

United States Patent [19]

Hinzpeter et al.

[11] Patent Number: 5,248,542

[45] Date of Patent: Sep. 28, 1993

[54] SEALING STRIP FOR HOUSING OF PELLETIZING MACHINE

[75] Inventors: Jürgen Hinzpeter; Ulrich Zeuschner, both of Schwarzenbek; Kurt Marquardt, Hamburg; Peter Lüneburg, Berkenthien; Hans-Joachim Pierags, Lübeck; Ulrich Arndt, Lauenburg; Günter Harten, Schwarzenbek, all of Fed. Rep. of Germany

[73] Assignee: Firma Wilhelm Fette GmbH, Nuremberg, Fed. Rep. of Germany

[21] Appl. No.: 851,646

[22] Filed: Mar. 16, 1992

[30] Foreign Application Priority Data

Mar. 16, 1991 [DE] Fed. Rep. of Germany ... 9103247[U]

[51] Int. Cl.[5] .......................... B32B 23/02; B22F 3/00; E06B 7/16

[52] U.S. Cl. .................................. 428/192; 428/35.7; 428/36.9; 428/99; 428/156; 428/167; 428/188; 428/213; 49/489.1; 49/495.1; 49/498.1; 100/296; 100/903; 425/222

[58] Field of Search ................. 428/156, 188, 99, 167, 428/192, 33, 35.7, 36.9, 81, 120, 131, 213, 446; 49/498, 489, 492, 495, 496, 484; 404/64, 65; 425/222; 100/903, 296

[56] References Cited

U.S. PATENT DOCUMENTS

| | | | |
|---|---|---|---|
| 2,156,681 | 5/1939 | Dewhirst et al. | 49/495 |
| 2,345,273 | 3/1944 | Macklanburg | 49/489 |
| 3,213,584 | 10/1965 | Bush | 49/489 |
| 3,286,425 | 11/1966 | Brown | 49/495 |
| 3,295,260 | 1/1967 | Bus et al. | 49/67 |
| 4,386,482 | 6/1983 | Quinif | 49/484 |

FOREIGN PATENT DOCUMENTS

| | | |
|---|---|---|
| 0247533 | 2/1987 | European Pat. Off. . |
| 8616133 | 2/1986 | Fed. Rep. of Germany . |

*Primary Examiner*—Donald J. Loney
*Attorney, Agent, or Firm*—Michael J. Striker

[57] ABSTRACT

A sealing strip for a housing of a pelletizing machine has a one-piece sealing body with a central web with an upper side having two upper edges and a lower side having two lower edges, two sealing lips extending from the upper edges of the upper side of the central web at an angle relative to one another, and a clamping strip extending from a center of the lower side of the central web and provided with lateral webs.

9 Claims, 1 Drawing Sheet

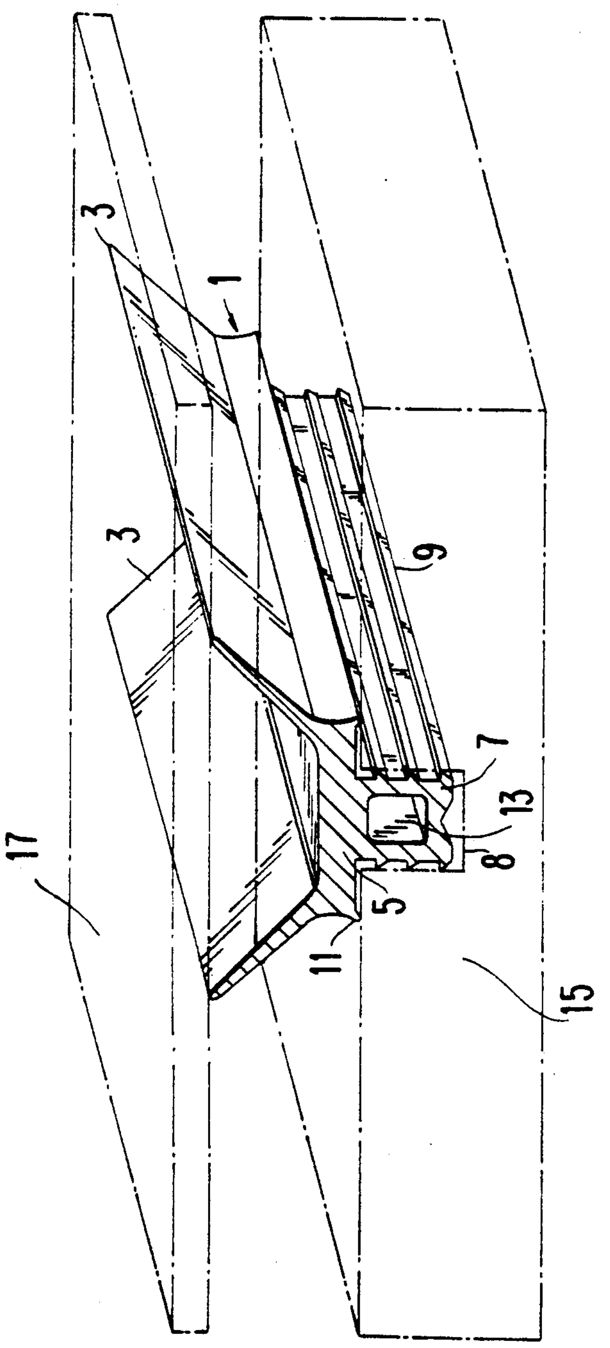
3
1
3
9
7
13
8
5
11
17
15

SEALING STRIP FOR HOUSING OF PELLETIZING MACHINE

BACKGROUND OF THE INVENTION

The present invention relates to a sealing strip for a housing of a pelletizing machine.

Pelletizing machines have usually a protective hood and four side walls which surround the machine and are provided with windows. The windows are turnable and are closeable by abutting against window frames. Moreover, flaps are often provided underneath the protective hood in the region of the drive aggregate of the machine. The flaps can be open for better accessibility to the aggregates of the machine.

It is known to provide the turnable windows over the protective hoods and other plates of the housing with seals. It prevents dirtying the pressing chamber of the pelletizing machine by entering surrounding air and also discharge of the pellet dust to the mounting space. When such seals are provided, there is the danger in the known pelletizing machines that in the case of insignificant untightness, air penetrates from the mounting space into the pressing chamber which is surrounded by the protective hood. Since the manufacture of the pellets must be performed only with conditioning clean air, one is forced to air-condition the whole air in the mounting chamber. This is of course relatively expensive.

A conditioning of the air can be dispensed with when in accordance with another solution the manufacture of the pellets is performed in vacuum maintained in the pressure chamber. Such an operation requires a complete sealing since otherwise, even with the smallest untightness, air is aspirated from outside into the pressing chamber. This untightness has to be taken into consideration when the protective hood is provided with relatively big turnable windows which are necessary for monitoring the machine and its service.

SUMMARY OF THE INVENTION

Accordingly, it is an object of the present invention to provide a sealing strip for a protective hood of a pelletizing machine, which avoids the disadvantages of the prior art and in particular take into consideration the above specified problems.

In keeping with these objects and with others which will become apparent hereinafter, one feature of the present invention resides, briefly stated, in a sealing strips for a housing of a pelletizing machine which is formed as a one-piece body and has at its upper part a central web with two sealing lips arranged at the edges of the central web and inclined relative to one another and at a lower side of the central web it is provided with a centrally arranged clamping strip having laterally extending webs.

When the sealing strip is designed in accordance with the present invention, it can be mounted and dismounted fast and simple with the use of a groove for its holding. It does not have to be glued for its holding. It provides the possibility to load the hollow space between both sealing lips in order to avoid a contamination with air.

In accordance with another feature of the present invention, the sealing lips are formed so that they narrow towards the outside.

Still another feature of the present invention is that the central web at the lower side is also provided with supporting lips.

Still additional feature of the present invention is that the clamping strip has a throughgoing chamber. The clamping strip can be also smaller than the distance between the sealing lips.

Finally, the sealing strip as a whole can be composed of silicon rubber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a perspective view showing a sealing strip in accordance with the present invention.

DESRIPTION OF THE PREFERRED EMBODIMENTS

A sealing strip for a housing of a pelletizing machine is identified as a whole with reference numeral 1. The sealing strip 1 has two sealing lips 3 which are inclined relative to one another. The sealing lips 3 are formed so that they narrow outwardly. The sealing lips extend from a central web 5 so that each sealing lip extends from one edge of the central web and is inclined outwardly. The central web 5 has a lower side, and supporting lips 11 extend from each edge of the lower side of the central web 5. The supporting lips 11 can be supported on a supporting part, such as for example a glass plate 15.

A clamping strip 7 extends from the center of the lower side of the central web 5. Both outer sides of the clamping strip 7 are provided with lateral webs 9. The lower surfaces of the webs 9 are inclined relative to the central web, so that the webs narrow outwardly and serve for firmly clamping the clamping strip in a groove 8. As shown in the drawing, the clamping strip 7 is provided with a longitudinally extending chamber 13. During insertion of the sealing strip 1 the chamber 13 is compressed since the strip 1 is composed of elastic material. Due to this compression the degree of clamping of the clamping strip 7 in the groove 8 is further increased. The sealing strip 1 as a whole can be composed, for example, of silicon rubber.

The sealing of the glass plate 15 relative to a wall 17 of a coating or a support is performed with lateral bending-out of both sealing lips arranged so that a chamber to be filled with air is provided between them.

It will be understood that each of the elements described above, or two or more together, may also find a useful application in other types of constructions differing from the types described above.

While the invention has been illustrated and described as embodied in a sealing strip for housing of a pelletizing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A sealing strip for a housing of a pelletizing machine, comprising a one-piece sealing body including a central web with an upper side having two upper edges and a lower side having two lower edges, two sealing lips extending from said upper edges of said upper side of said central web at an angle relative to one another and bendable outwardly by a plate to be sealed so as to form between said sealing lips a chamber to be filled with air, and a clamping strip extending from a center of said lower side of said central web and provided with lateral webs.

2. A sealing strip as defined in claim 1, wherein said sealing lips have a cross-section which narrows outwardly.

3. A sealing strip as defined in claim 1, wherein said central web is provided with supporting lips at its lower side.

4. A sealing strip as defined in claim 3, wherein said supporting lips extend from said lower edges of said lower side of said central web.

5. A sealing strip as defined in claim 3, wherein said clamping strip has a throughgoing chamber.

6. A sealing strip as defined in claim 1, wherein said sealing lips are spaced from one another by a predetermined distance, said clamping strip being smaller than said distance between said sealing lips.

7. A sealing strip as defined in claim 1, wherein said body is composed of an elastic material.

8. A sealing strip as defined in claim 7, wherein said body is composed of silicon rubber.

9. A housing of a pelletizing machine, comprising shoe plates to be sealed relative to one another; and a one-piece sealing body including a central web with an upper side having two upper edges and a lower side having two lower edges, two sealing strips extending from said upper edges of said upper side of said central web at an angle relative to one another, and a clamping strip extending from a center of said lower side of said central web and provided with lateral webs, said clamping strip being inserted in one of said plates, while said sealing lips being bent outwardly by another of said plates so as to form between said sealing lips a chamber to be filled with air.

* * * * *